United States Patent [19]

Blake

[11] 4,385,774

[45] May 31, 1983

[54] HEAVY DUTY VEHICLE SUSPENSION SYSTEM

[76] Inventor: John C. Blake, 6193 Gerdts Dr., San Jose, Calif. 95135

[21] Appl. No.: 245,741

[22] Filed: Mar. 20, 1981

[51] Int. Cl.$^3$ .............................................. B60G 7/02
[52] U.S. Cl. ................................................... 280/663
[58] Field of Search ............... 280/663, 696, 693, 698, 280/701, 716; 267/64 B, 14.4, 136, 60

[56] References Cited

U.S. PATENT DOCUMENTS 2,850,276 9/1958 Jackson ............................... 280/663
4,280,717 7/1981 Hanai et al. ......................... 280/663

Primary Examiner—Richard A. Bertsch
Attorney, Agent, or Firm—Francis W. Anderson; Jack M. Wiseman

[57] ABSTRACT

A shock and vibration mount includes a resilient elastomeric member arranged to act with two spaced spring units, each of which includes a group of stacked, disc-shaped annular springs. Low level impacts and vibrations are transmitted from a rod, that is movable with the impacted member or with a member reacting to an impact, to the elastomeric member through either of the stacked units, high intensity shocks being attenuated first by the elastomeric member and then by one of the stacked units.

10 Claims, 1 Drawing Figure

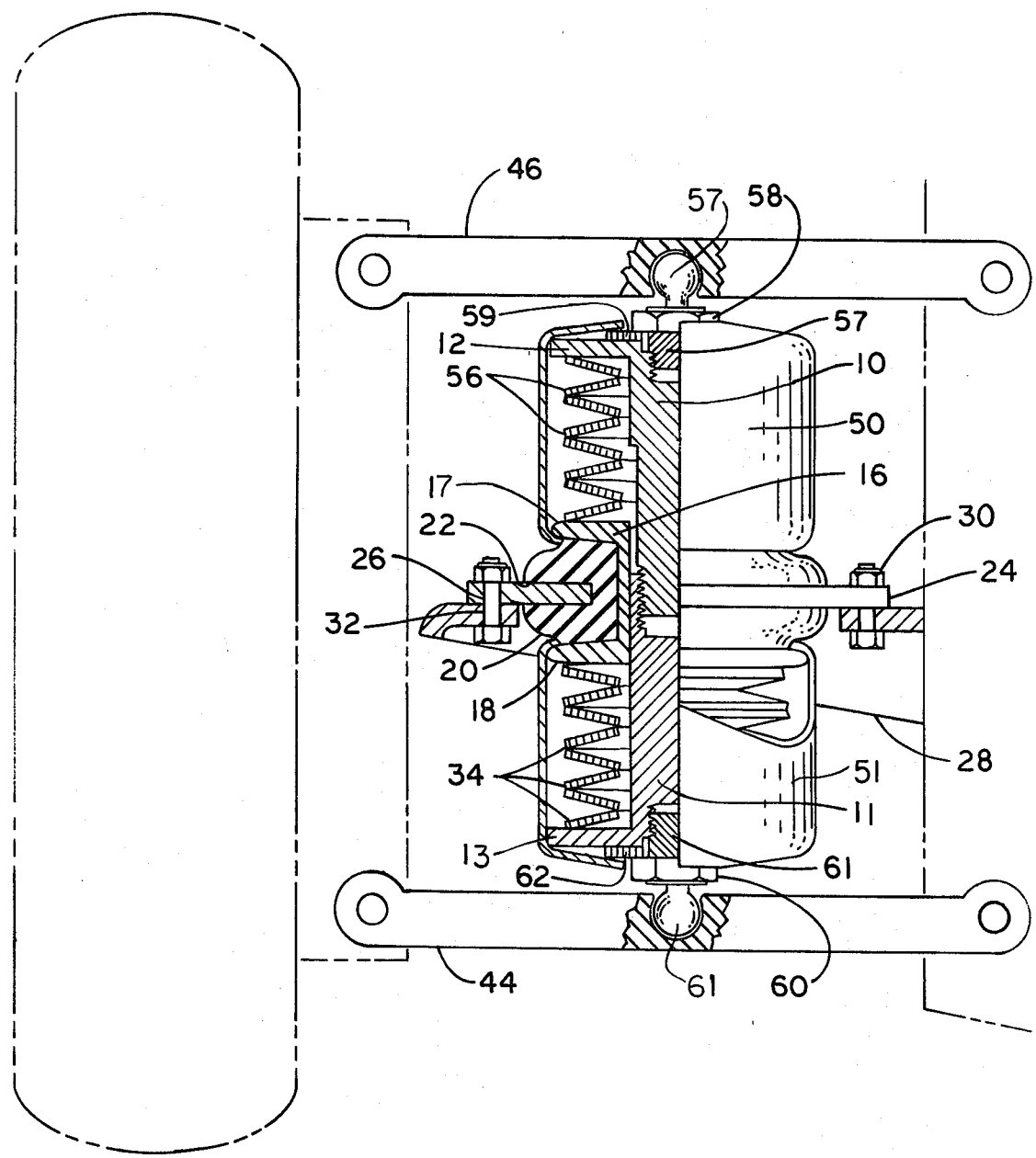

HEAVY DUTY VEHICLE SUSPENSION SYSTEM

BACKGROUND OF THE INVENTION

This invention relates to a vehicle suspension system and more particularly to a vehicle suspension system composed of elements consisting of a number of spring systems arranged in series to attenuate and damp vertical or horizontal shock waves.

Off the road vehicles, such as four wheel drive recreational vehicles, earth moving equipment and treaded vehicles such as tanks and tractors have in general compromised the ability of the vehicle's road suspension system to supply an isolation system over a wide range of road conditions by a requirement to protect the suspension system itself against damage from high intensity off the road shocks. The compromise in general has taken the form of limiting the travel of the suspension system by rubber bumpers that are contacted under high shock conditions by the vehicle's suspension system before the suspension system is damaged. Under unusually severe shock conditions, the rubber bumpers are not only contacted but compressed to the point where the rubber is no longer compressible and "hard bottoming" occurs. "Hard bottoming" results in the transmission of high shock loads to the vehicle's chassis and the vehicle's occupants.

Most vehicle suspension systems use helical, leaf or torsion bars to provide road shock isolation. Since only the leaf spring of these three types provides a small amount of damping, the vehicle's suspension must also include some type of damping device which may be hydraulic or a friction device. Since both of these damping devices are nonlinear, the suspension system becomes nonlinear and possibly subject to "hard bottoming" even if the limit of travel of the suspension system has not been reached.

Therefore, it is a primary object of this invention to provide a vehicle suspension element that will not only provide for the normal road isolation of a vehicle suspension system, but also for the abnormal condition of high shock load imposed by unusually rough terrain. It is also an object of this invention to provide a high degree of damping so that additional damping services, hydraulic or other types, are not required.

The patent to Blake, U.S. Pat. No. 3,770,232, discloses the combined use of an elastomeric annulus and sets of annular metal springs to absorb shocks received by a support member before they reach a platform on which a gas turbine or the like is mounted. The elastomeric annulus is connected directly to the shock-receiving support member so that the annulus immediately responds to such shocks. While this patent does disclose an elastomeric annulus and annular metal springs acting together to absorb shocks and vibration, it does not teach or suggest how these spring members could be applied to absorb shocks received by the two control arms of a vehicle.

SUMMARY OF THE INVENTION

The shock and vibration absorbing arrangement of this invention includes an elastomeric member connected to a member, such as the chassis of a vehicle, that is to be protected from shock and a set of annular springs operatively connected to each of two shock-receiving members, such as the upper and lower control arms of a wheel suspension system, for transmitting forces to the elastomeric member.

DESCRIPTION OF THE DRAWING

The single FIGURE of the drawing is a diagrammatic side elevation, partly in section and partly broken away, of the mechanism of the present invention.

DESCRIPTION OF THE PREFERRED EMBODIMENT

The heavy duty vehicle suspension system of the present invention includes an elongate rod having an upper section 10 and a lower section 11 threaded together to form a single rod that is adjustable in length. At its upper end the rod has an annular flange 12 and, at its lower end, a flange 13. A sleeve 16, which is slidably disposed on the rod, is provided with two spaced annular flanges 17 and 18, and a resilient elastomeric annulus or grommet 20 is disposed between the flanges 17 and 18 in engagement with the inner walls of the flanges. The annulus 20 is preferably composed of rubber, and includes a groove 22 around the outer periphery thereof. A flat ring 24 is embedded within the groove and is provided with a plurality of circumferentially spaced holes 26 which are aligned with holes 32 in a member 28 to receive nut and bolt units 30 for clamping the ring 24 to the member 28. THe member 28 is the structural member which is to be protected from shocks, as for example the frame or chassis of the vehicle.

A first set of disc-shaped annular metal springs 34, which are vertically stacked to engage each other along alternating inside and outside edges, is disposed between the lower flange 13 of the rod and the flange 18 of the sleeve 16. The annular springs 34 are of the type generally known as "Belleville" springs. A second set of similar, stacked, disc-shaped annular springs 56 is disposed between the flange 17 of the sleeve and the upper flange 12 of the rod. A casing 50 encloses the second set of springs 56, and the flanges 12 and 17, and a casing 51 encloses the set of springs 34 and the flanges 13 and 18.

At its upper end, the rod section 10 carries a ball unit 57 that is disposed in a partially spherical recess in a shock-receiving member 46, such as the upper control arm of the suspension of the vehicle. A lower extension 57' of the ball 57 is threaded and is engaged in a tapped opening in the upper end of rod section 10. A nut 58 which is threaded on the upper end of the ball unit 57 engages a lock washer 59 and urges it against the upper surface of flange 12, thus locking the ball unit 51 to the rod section 10. Similarly, a ball unit 61 has a shank portion 61' threaded into a tapped opening in the lower end of rod section 11 and is locked to the flange 13 of rod section 11 by a lock washer 62 and a nut 60, that is threaded onto the ball unit 61.

In normal operation, the heavy duty vehicle suspension system operates as a vibration isolator absorbing the minor vibration and shock loads generated by operation of a military tank or "off road" type vehicles on pavement or smooth terrain. These type of vibrations are attenuated by the resilient rubber annulus 20 while the stacked metal springs remain substantially rigid. However, under high shock conditions generated by operation of a vehicle over rough terrain the metal springs become active and compress, limiting the overall or combined spring rate to a satisfactory soft value instead of the infinite spring constant that would result from the rubber annulus acting alone. Impingement of a high intensity shock load on the bogie (military tank) or wheel (off road vehicle) would initially effect a rapid acceleration of the control arms 44, 46 in a vertical upward direction. Rapid acceleration of the arms 44, 46 correspondingly effects an acceleration of the peripheral flange 13 which is fixedly attached thereto through the rod 10, 11. The acceleration is initially transmitted through flange 13 to the lower metal springs 34 to peripheral flange 18. Flange 18 rapidly compresses the resilient rubber annulus 20 in the area between peripheral flange 18 and flat ring 24 which is rigidly attached to the vehicle structure 28. The rubber annulus within a few milliseconds becomes substantially incompressible in the area between the flat ring 24 and the peripheral flange 18, changing the spring constant of the rubber annulus from a low spring constant to an infinite spring constant. Further acceleration of flange 18 is halted so that acceleration of flange 16 in a vertical upward direction is impacted to the lower stack of springs 34 and acts to compress the disc-shaped metal springs 34 and further damp the high intensity shock transmitted to the platform 28 through flat ring 24. The disc-shaped metal springs have a variable incremental deflection which is a function of shock loading, so that high shock loads are increasingly attenuated with a high degree of damping to assure soft bottoming. Also it is readily apparent that the disc-shaped metal springs have a sufficiently high initial spring constant so as not to deflect until after the spring constant of the rubber annulus 20 becomes substantially infinite.

The shock and vibration mount of this invention must also include the ability to attenuate the shock rebound which is manifest as a deceleration and subsequent reversal of the vehicle support arms in the upward direction as the shock and vibration mount is actuated.

The present system damps any shocks that are incident to the downward movement of the control arms 46 and 44 after their upward movement has been arrested. Such rebound shocks are transmitted to the annulus 20 by the rod section 10 and the springs 56. As a result, the part of the annulus 20 between the ring 24 and the flange 17 is first compressed and then the shock is further attenuated by the springs 56. If the resilient rubber annulus were non-symmetrical with respect to the flat ring 24 the two stacks of disc-shaped metal springs 34, 56 would have to be individually tailored in order to obtain similar load/deflection characteristics for both the initial shock direction and the rebound direction. Precise tailoring may not be necessary, however, because the initial shock and rebound direction curves are generally different.

The stacked disc-shaped metal spring 34, 56 arranged in series with the resilient rubber annulus permit a wide variety of load versus deflection performances so that shock loads can be attenuated for a range of conditions and to a predetermined degree. Under high intensity shock conditions, high loads and large displacements, the stacked disc-shaped metal springs 34, 56 become effective in limiting the overall spring rate to an extended linear value rather than the hard spring rate that would result from the rubber mounts alone. The high degree of damping, together with the high attenuation value for damping-of accelerating forces supplied by the shock and vibration mounts of the invention, will reduce the moment and shear loads imposed on the tank or vehicle suspension system and associated equipment mounted thereon. Also, the high damping will require less space for the mounting system due to the smaller deflections of the platform that will occur under shock conditions.

In the following claims, the term "structural member" will be used to indicate the portion or member of the civilian or military vehicle that is to be protected from shocks, such as the chassis or frame of the vehicle. Also, the term "control arm" will be used to indicate a member that connects the bogie or wheel of the vehicle to the structural member.

While a preferred embodiment of the present invention has been shown and described, it will be appreciated by those skilled in the art that modifications and substitutions may be made thereto without departing from the invention's fundamental theme.

What is desired to be protected by Letters Patent is:

1. A system for absorbing and isolating shocks and vibrations transmitted between an upper and lower control arm of a vehicle and an intermediate structural member of a vehicle that is to be isolated from shock comprising a rod operatively connected at its upper end to the upper arm and at its lower end to the lower arm, first yieldable means connected between a lower portion of said rod and the intermediate structural member to attenuate upward pressures on the lower arm, and second yieldable means connected between an upper portion of said rod and the intermediate structural member to resist upward pressures on the structural member.

2. A system according to claim 1 wherein said first yieldable means includes elastomeric means, and a stack of annular springs disposed in tandem between the lower portion of said rod and the structural member of the vehicle, movement of the lower control arm being transmitted through said rod and said springs to said elastomeric means.

3. A system according to claim 1 wherein said first yieldable means includes an annular resilient member encircling said rod and operatively connected to the structural member, and a stack of annular springs disposed around said rod and positioned between the lower portion of said rod and said resilient member, movement of the lower support arm being transmitted through said rod and said springs to said resilient member.

4. A system according to claim 1 further including a sleeve slidable along said rod and having an outwardly-projecting flange, and wherein said first yieldable means includes an annular resilient member disposed between said flange and the structural member, and a stack of annular springs disposed between said flange and the lower portion of said rod, movement of the lower control arm being transmitted through said rod and said springs to said resilient member.

5. The system of claim 1 wherein said rod has a radially outwardly projecting flange at its lower end and wherein said first yieldable means includes a sleeve slidably disposed on said rod and having an outwardly projecting flange, a rubber ring connected to the structural member of the vehicle and disposed between the flange on said sleeve and the structural member, and a stack of annular springs disposed around said rod between the flange on said sleeve and the flange on said rod.

6. The system of claim 1 wherein the connections between the lower control arm and said rod, and between the upper control arm and said rod comprise a ball mounted in each end of said rod, one ball being disposed in a socket in the lower control arm and the other ball being disposed in a socket in the upper control arm.

7. The system of claim 1 wherein said first and second yieldable means includes a sleeve slidable on said rod and having a pair of flanges, one disposed on each side of the structural member, and a rubber ring disposed between said flanges and secured to the structural member.

8. The system of claim 7 wherein said first yieldable means includes a stack of annular springs disposed between one of the flanges of said sleeve and the lower portion of said rod, and said second yieldable means includes a stack of annular springs disposed between the other flange of said sleeve and the upper portion of said rod.

9. The system of claim 7 wherein said rod has a first flange at its lower end and a second flange at its upper end and wherein said first yieldable means includes a stack of annular springs disposed between one of the flanges of said sleeve and the first flange of said rod, and said second yieldable means includes a stack of annular springs disposed between the other flange of said sleeve and the second flange of said rod.

10. A system for absorbing the shocks and vibrations transmitted between the upper control arm, the lower control arm and the chassis of a vehicle comprising a rod pivotally connected at the upper end to the upper control arm and at the lower end to the lower control arm; means defining a first flange on said rod adjacent the upper end thereof and a second flange on said rod adjacent the lower end thereof; a sleeve slidable on said rod intermediate said first and second flanges, said sleeve having upper and lower spaced flanges; a rubber ring disposed between said upper and lower flanges and connected to the frame of the vehicle; said rod, said sleeve and said ring being disposed in an opening in the chassis of the vehicle; a first set of annular, stacked springs disposed between said first flange of said rod and said upper flange on said sleeve; and a second set of annular stacked springs disposed between said second flange of said rod and said lower flange on said sleeve.

* * * * *